United States Patent [19]

Chen

[11] Patent Number: 4,999,149
[45] Date of Patent: Mar. 12, 1991

[54] PRODUCTION OF HIGH STRENGTH CELLULOSE FIBER USING ZINC CHLORIDE, ORGANIC SOLVENTS AND AQUEOUS SOLUTION

[75] Inventor: Li Fu Chen, West Lafayette, Ind.

[73] Assignee: Purdue Research Foundation, Division of Sponsored Programs, West Lafayette, Ind.

[21] Appl. No.: 261,000

[22] Filed: Oct. 21, 1988

[51] Int. Cl.$^5$ ............................................. D01F 2/02
[52] U.S. Cl. ................................ 264/187; 264/210.6; 264/210.8; 264/211.11; 264/211.15; 264/211; 106/163.1
[58] Field of Search ............ 264/186, 187, 207, 210.8, 264/208, 211.11, 211.15, 210.6, 211; 106/163.1, 165, 194

[56] References Cited

U.S. PATENT DOCUMENTS 625,033  5/1899  Hoyne ............................... 106/163.1
4,388,256  6/1983  Ishida et al. ......................... 264/41

*Primary Examiner*—Hubert C. Lorin
*Attorney, Agent, or Firm*—Cushman, Darby & Cushman

[57] ABSTRACT

The present invention relates to the production of high tensile strength, solvent-spun cellulose fiber which is stable in alkaline solutions. More particularly, the invention relates to a process in which cellulose is solubilized in a zinc chloride solution then extruded into a coagulation medium in which the cellulose fibers form. The fibers are removed from the coagulation medium, treated to remove the coagulation medium, stretched and recrystallized in water, thus forming the high tensile strength, solvent-spun cellulose fibers.

23 Claims, No Drawings

PRODUCTION OF HIGH STRENGTH CELLULOSE FIBER USING ZINC CHLORIDE, ORGANIC SOLVENTS AND AQUEOUS SOLUTION

FIELD OF THE INVENTION

The present invention relates to the production of high tensile strength, solvent-spun cellulose fiber which is stable in alkaline solutions. More particularly, the invention relates to a process in which cellulose is solubilized in a zinc chloride solution then extruded into a coagulation medium in which the cellulose fibers form. The fibers are removed from the coagulation medium, treated to remove the coagulation medium, stretched, and recrystallized in water, thus forming the high tensile strength, solvent-spun cellulose fibers of the present invention.

BACKGROUND OF THE INVENTION

Cellulose, the most abundant polymer on earth, is a straight-chain polymer of anhydroglucose with beta 1-4 linkages. Cellulose fiber in its natural form comprises such materials as cotton and hemp, while solvent-spun fiber comprises products such as rayon.

The process most frequently used to produce solvent-spun fiber is known as the viscose process. In the viscose process cellulose xanthate, a cellulose derivative, is solubilized then spun into a coagulation bath where the fiber forms. The resulting fiber is a product known as viscose.

A second solvent-spun fiber product, cellulose acetate, is produced when a cellulose derivative is solubilized in an organic solvent, then spun into water or alcohol where it coagulates to form fiber. The fiber may be regenerated from its derivative form to true (non-derivatized) cellulose using an alkaline solution, but such a regeneration step is rarely performed.

In addition to the production of viscose and cellulose acetate, a third embodiment of the solvent-spun process involves the dissolution of true cellulose in a solvent which is then spun into a coagulation bath in which fiber formation occurs.

Due to the high processing costs and the generally inferior properties of the fiber products formed when nonderivatized cellulose is employed in the solvent-spun process, derivatized cellulose such as that used in the viscose process is generally employed when producing solvent-spun fibers.

Approximately 20 years ago it became apparent that the production of solvent-spun fiber by methods such as the viscose process was becoming disadvantageous due to the high capital costs and environmental considerations associated with their use. For this reason, modified or alternative methods for producing solvent-spun fiber were sought.

Several cellulose solvents were tested for use in a modified or alternative solvent-spun process. A few achieved favorable results in solubilizing the cellulose, but were ultimately deemed to be impractical for other reasons.

Specifically, solvents comprising solutions of $SO_2/NH_3$, and $SO_2/(CH_3)_2HN$ were tested and found to form good cellulose solutions (i.e., solutions having reasonable viscosities and practical degrees of polymerization). Unfortunately, it was impractical to regenerate cellulose fiber, and to recover the solvent from the coagulation medium.

Similarly, a 85% $H_3PO_4$ solution was tested for use as a cellulose solvent and was found to dissolve cellulose well, however, the resulting solution contained gels and fibers which made filtration very difficult. Additionally, when phosphoric acid was tested, the cellulose went into solution well, but the phosphoric acid could not be washed from the resulting fiber. D.M. MacDonald, *The Spinning of Unconventional Cellulose Solutions* in Turbak et al., "Cellulose Solvent Systems" ACS Sym. Seri. 58 (1977).

Solutions of 52.5% $Ca(CNS)_2$, $DMF/N_2O_4$, and $DMSO$/para-formaldehyde were also tested. These too proved unsuccessful for use, for while the solutions were found to be acceptable cellulose solvents, they either formed weak fibers or were difficult to recover from the coagulation medium once fiber formation occurred. Hudson, S.M., Cuculo, L.A., J. Macromolecular Science Rev., Macromolecular Chemistry (1980) C18(1) p. 64.

In addition to the solvents listed above, MacDonald (supra) also reported testing a 64% $ZnCl_2$ solution. As with the previous solvents, the results were unacceptable. In this case, the solubilized cellulose could not be spun and the coagulated fibers were noncohesive.

In view of these results and until the present invention, the use of $ZnCl_2$ as a cellulose solvent has only been successfully utilized in a limited number of processes.

In one such process, the carbon fiber process, cellulose is solubilized in a $ZnCl_2/HCl$ solution then extruded into a methanol bath wherein the cellulose coagulates to form fibers. These fibers are usually weak, and while they can generally be handled with tweezers, they are not usually strong enough to permit spinning.

Following coagulation, the $ZnCl_2/HCl$ is removed from the cellulose by prolonged soaking in the methanol bath. The fibers are then carbonized.

In addition to the carbon fiber process, the production of "vulcanized fiber" or nonwoven mats also involves the use of a $ZnCl_2$ cellulose solvent. See, eg. Young and Miller, *Formation and Properties of Blended Nonwovens Produced by Cellulose-Cellulose Bonding* in Gould et al. "Blended Nonwovens," ACS Symp. Ser. 10 (1975).

In producing vulcanized fiber, cellulose is swollen and softened into a gel using a concentrated $ZnCl_2$ solution. The gel is then pressed into sheets which are leached with water in order to extract the $ZnCl_2$ from the cellulose. This results in the formation of a tough, rigid, nonwoven plastic sheet.

Prior to the present invention, the use of $ZnCl_2$ as a cellulose solvent has had limited application as described above. Moreover, its use in a solvent-spun process has until now proven impractical.

The present invention is advantageous, therefore, for it teaches the use of $ZnCl_2$ as a cellulose solvent in a solvent-spun process, as well as teaching the production of a high tensile strength, solvent-spun cellulose fiber resulting therefrom. The use of $ZnCl_2$ in the present invention is further beneficial, for $ZnCl_2$ is nontoxic, less corrosive than previously employed solvents and is easily recoverable for reuse. Further advantages of the present invention are set-forth below.

Absent the teachings of the present invention, it is generally preferred that the cellulose starting material employed in solvent-spun processes have a high degree of polymerization (hereinafter "DP"), i.e. a DP preferably above 600, but at least above 300 (hereinafter "high DP cellulose"), when strong fiber products are desired. Unfortunately, this usually means that the cellulose starting material must be obtained from conventional pulping processes. While the DP of such pulp is normally high, the conventional processes are relatively expensive to operate and their pulp products are generally costly.

Unlike the solvent-spun processes previously discussed, the solvent-spun process of the present invention enables one to use both high DP cellulose and cellulose with a DP ranging from about 100 to 300 (hereinafter "low DP cellulose"). In fact, the cellulose starting material of the present invention may range in DP from about 100 to 3000. Therefore, pulp obtained from a non-conventional, acid pulping process (a potentially cheap and efficient process yielding dissolving grade cellulose having a DP of 400 or less) which is generally unsuitable for use in existing solvent-spun fiber processes, may be used herein according to the teachings of the present invention. For purposes of the present invention, "dissolving grade" cellulose comprises substantially lignin-free cellulose.

In addition to the above, the ability to use low DP cellulose in the process of the present invention is further advantageous because low DP cellulose is theoretically both cheap and abundant, potentially derivable from both municipal and agricultural wastes such as used paper, corn stalk, and sugar cane bagasse.

As a further advantage, the process of the present invention may be employed (with only slight modifications described infra) to form cellulose fibers and films suitable for use in food and pharmaceutical applications. In such instances, food-grade cellulose and food-grade $ZnCl_2$ are taught for use herein.

In addition to the DP of the cellulose starting material being determinative of the strength of the cellulose fibers of the existing solvent-spun processes, it has also been observed that fiber strength is dependent upon the arrangement of the cellulose crystals within the fiber as well.

To clarify, cellulose may exist in amorphous or crystalline form. In fact, both amorphous and crystalline regions form within the cellulose fiber upon coagulation. The ratio and orientation of these regions vary, but in the existing solvent-spun processes both are determined during the coagulation step.

By way of example, when cellulose is coagulated in a typical solvent-spun process, some molecules randomly orient themselves in a crystalline matrix, the degree of crystallization being determined, generally, by the presence and amount of water in the coagulation medium. Neither the ratio nor the orientation of the crystalline regions can be controlled in such a process, because the crystallization occurs simultaneously with the coagulation of the fiber.

In view this, it was theorized by the present inventor that by separating the steps of coagulation and crystallization in a solvent-spun process, the ratio of crystalline and amorphous regions in the fiber could be controlled. Moreover, by applying tension to the fiber after coagulation but before crystallization, the fiber could be stretched thereby orienting the amorphous and crystalline regions therein. This would result in a solvent-spun cellulose fiber having high tensile strength.

Based on this theory, and in view of the fact that $ZnCl_2$ was known to be a good cellulose solvent, a process for producing high tensile strength, solvent-spun cellulose fiber was developed.

Additionally, a second embodiment of the present process was found to produce a low tensile strength cellulose fiber particularly suitable for food and pharmaceutical applications when food-grade starting materials and reagents were employed.

SUMMARY OF THE INVENTION

In accordance with the present invention, high tensile strength, alkaline stable, solvent-spun cellulose fiber may be produced from dissolving grade cellulose having a DP in the range of from about 100 to 3000.

The present invention generally comprises a process in which cellulose is mixed, heated and solubilized in solvent comprising a solution of $ZnCl_2$. The cellulose/$ZnCl_2$ solution is then extruded into a coagulation medium comprising one or more organic solvents wherein the cellulose coagulates to form fibers. The resulting fibers are then treated under tension to stretch and orient the fibers, as well as to remove any solvent or coagulation medium therefrom. The fibers are then placed in a water bath where recrystallization is fully achieved. The fibers may then be dried or otherwise treated for packaging, shipment or use.

More specifically, the process of the present invention comprises the steps of:

(a) adding a solvent to cellulose to form a mixture, the solvent comprising a solution of zinc chloride ($ZnCl_2$), and the resulting mixture comprising cellulose/$ZnCl_2$;

the mixture having a final cellulose concentration in the range of from about 5% to about 45% weight to volume (w/v), and a final $ZnCl_2$ concentration in the range of from about 55% to about 80% weight to weight (w/w), more preferably from about 62% to about 76%, concentrations at the upper and lower extremes of this range are suggested for producing the strongest cellulose fibers;

(b) stirring and heating the cellulose/$ZnCl_2$ mixture at a temperature ranging from about 40° C. to about 120° C., more preferably from about 40° C. to about 100° C., and most preferably at about 65° C, until the cellulose dissolves and the mixture becomes clear, thereby forming a cellulose/$ZnCl_2$ solution;

(c) extruding the cellulose/$ZnCl_2$ solution into a coagulation medium wherein the cellulose in the cellulose/$ZnCl_2$ solution coagulates to form fiber, the fiber not being fully crystallized;

the coagulation medium comprising one or more alcohols or ketones, the alcohols generally being selected from the group consisting of straight or branched chain $C_1$ to $C_4$ alcohols such as methyl, ethyl, propyl and isopropyl-alcohol and the ketones generally being selected from the group consisting of $C_3$ to $C_5$ ketones such as acetone or methylethylketone (MEK);

(d) removing the fiber from the coagulation medium and treating the fiber to remove residual solvent and coagulation medium therefrom;

(e) applying tension to the fiber sufficient to stretch the fiber and orient the molecules therein;

the above treatment may comprise evaporation or other conventional means known to those skilled in the art;

(f) submerging the fiber in a bath containing water to fully crystallize the fiber;

(g) removing the fiber from the water bath for drying and/or further treatment.

Several optional manipulations may be performed at step (a), for instance:

(i) pre-wetting the surface of the cellulose with water (optionally containing one or more of the chlorides as listed below) prior to its dissolution in the $ZnCl_2$ solution, thereby facilitating the rapid formation of a homogenous cellulose/$ZnCl_2$ solution low in solid particles and having a chemical and physical structure suitable for extrusion;

(ii) adding chlorides of magnesium, calcium, lithium or aluminum directly to the cellulose, or to the cellulose/$ZnCl_2$ mixture, thereby aiding in the mixing, dissolution and the extrusion of the cellulose/$ZnCl_2$ by lowering its viscosity.

As disclosed in sub-step (i) above, pre-wetting the cellulose reduces the number of solid particles normally encountered when a solution of zinc chloride is added directly to dry cellulose. The presence of solid particles is generally disadvantageous in solvent-spun processes, for the solid particles tend to clog the narrow openings of the spinnerettes which are frequently employed in these processes. Furthermore, occasionally the DP of the cellulose in the cellulose/$ZnCl_2$ solution decreases prior to extrusion. Pre-wetting the cellulose prior to its mixture with the $ZnCl_2$ solvent appears to alleviate this problem as well.

In regard to coagulation step (c), it should be noted that the coagulation medium serves to remove the $ZnCl_2$ and other salts present in the extruded cellulose by dissolving and diluting them in the medium. This results in a decreased concentration of $ZnCl_2$ in the extruded cellulose/$ZnCl_2$ solution so as to enable the cellulose to coagulate to form fibers.

It is also important to note that in keeping with the inventor's goal to separate the steps of coagulation and crystallization in the present process, the water content in the coagulation medium should be kept to a minimum in order to prevent premature recrystallization of the fiber prior to stretching and orientation.

Likewise, it should also be noted that when extruding the cellulose/$ZnCl_2$ solution into the coagulation medium, the solution may be extruded directly or indirectly into the medium. Direct extrusion entails the introduction of the cellulose/$ZnCl_2$ solution into the coagulation medium through a nozzle or spinnerette immediately at or below the surface of the medium, while indirect extrusion may be achieved, for example, by extrusion of the solution into air then into the coagulation medium.

While indirect extrusion methods may be employed in the process of the present invention such methods are not preferred for they tend to form fibers of non-uniform dimension and strength.

The above description provides the basic steps in the formation of the high tensile strength cellulose fiber of the present invention. It will be apparent to those skilled in the art that modifications and variations can be made in this process without departing from the scope or spirit of the invention. For example, the fibers may be finished according to common practice, and/or various modifying agents may be added to the solvent, the coagulation medium or the crystallization bath.

Additionally, by slight modification to the present process, a cellulose fiber or film suitable for use in food and pharmaceutical applications may be produced.

For example, a food-grade cellulose fiber may be formed which can be woven into a netting or binding for use as a packaging on food products such as meats. Similarly, when the cellulose/$ZnCl_2$ solution of the present invention is extruded as a film, it may be used as an edible film or casing on sausages and the like.

To form products such as those listed above, food-grade reagents must be employed, namely, food-grade cellulose and a food-grade solvent. The present invention is important, therefore, for it teaches the use of $ZnCl_2$ as a cellulose solvent in a solvent-spun process, and it teaches a solvent-spun process in which the zinc chloride may be successfully and practically used to form a fiber suitable for the uses envisioned and disclosed herein.

The use of $ZnCl_2$ is advantageous in the present process for it is nontoxic and is available in food-grade quality. Furthermore, while the use of food-grade quality reagents in most processes is prohibitively expensive, $ZnCl_2$ is recoverable from the coagulation medium of the present process for reuse, thus significantly lowering its cost per use.

In the food applications listed above, the need for a fiber having a high tensile strength is not always great, therefore, after dissolution and extrusion the fibers (or film) may be removed from the coagulation medium and transferred directly into the crystallization bath. Alternatively, the fibers or film may also be coagulated and recrystallized simultaneously. This would result in fibers with tensile strengths of about 1.6 to 1.9 g/den (see Example 5 below).

DETAILED DESCRIPTION OF INVENTION

Reference will now be made in detail to the preferred embodiments of the present invention, examples of which are set forth below:

EXAMPLE I

Cellulose (Avicel PH 101) was pre-wet by mixing with water. A 76% zinc chloride solution (w/v) was added to the pre-moistened cellulose and the mixture was stirred immediately and continuously at 60° C. for about 15 minutes, by which time the cellulose had dissolved.

When pre-wetting the cellulose, the amount of water added to each sample was controlled so that upon the addition of the 76% $ZnCl_2$ solution thereto, the final $ZnCl_2$ concentration in the resulting cellulose/$ZnCl_2$ mixtures ranged from 66% to 74.6% as depicted below in Table 1. The final cellulose concentration in each sample was 10% (w/v).

TABLE 1

| FIBER No. | 76% $ZnCl_2$ (ml) | $H_2O$ (ml) | CELLULOSE (g) | FINAL CONC. $ZnCl_2$ (%) | TENSILE STRENGTH (g/den) |
|---|---|---|---|---|---|
| 1 | 2 | 0.23 | 0.223 | 74.4 | 4.1 |
| 2 | 2 | 0.44 | 0.244 | 72.7 | 3.3 |
| 3 | 2 | 0.68 | 0.268 | 70.8 | 3.0 |
| 4 | 2 | 0.98 | 0.298 | 68.6 | 2.8 |
| 5 | 2 | 1.35 | 0.335 | 66.0 | 4.5 |

Without cooling, the cellulose/$ZnCl_2$ solutions were extruded by syringe through a 22 gauge hypodermic needle into acetone which served as the coagulation media. After about 15 minutes, cellulose fibers about three feet in length were removed from the media. The ends of the fibers were fixed to a table and the fibers were then allowed to air dry. The drying caused the fibers to shrink. Due to their attachment to the table, this shrinkage exerted tension on the fibers causing them to stretch.

After the fibers were completely dried and stretched, they were submerged in a water, i.e. crystallization bath for about ten minutes. The fibers were then removed and dried in an oven at 60° C.

The resulting fibers had tensile strengths as depicted in Table 1.

EXAMPLE II

A cellulose/$ZnCl_2$ mixture containing 15% cellulose (w/v) was prepared according to the procedure described in Example I. The final zinc chloride concentration in the mixture was 67% (w/w).

After heating and dissolution, the cellulose/$ZnCl_2$ solution was extruded into six baths individually containing the following coagulation media: acetone, ethyl alcohol, acetone:water (2:1), acetone:water (5:1), ethyl alcohol:water (5:1), and acetone:ethyl alcohol (1:1). The resulting fibers were then treated as described in Example I. The tensile strengths of the 6 resulting fibers are listed in Table 2.

TABLE 2

| COAGULATION BATH SOLVENT | TENSILE STRENGTH (g/den) |
| --- | --- |
| Acetone | 5.1 |
| Ethyl Alcohol | 5.5 |
| Acetone:water (2:1) | 2.4 |
| Acetone:water (5:1) | 3.8 |
| Alcohol:water (5:1) | 2.7 |
| Acetone:Alcohol* (1:1) | 3.0 |

*For purposes herein, "alcohol" comprises ethyl alcohol.

EXAMPLE III

A cellulose fiber was prepared from a cellulose/$ZnCl_2$ mixture as described in Example II using ethyl alcohol as the coagulation medium. The procedure set-forth in Example I was followed. The resulting fiber had the following characteristics: tensile strength—5.7 g/den and fiber elongation—13%. Solubility of the fiber in an alkaline solution was undetectable and the zinc content in the fiber was less than 0.4% by weight.

EXAMPLE IV

A cellulose fiber was formed using alpha-cellulose (DP—400, Sigma Chemical Co.) as the cellulose starting material and zinc chloride solution as the cellulose solvent. The final $ZnCl_2$ concentration in the cellulose/$ZnCl_2$ mixture was 67% (w/w). The cellulose concentration was 10% (w/v).

The procedure of Example I was followed, and acetone or ethyl alcohol were used as the coagulation media. The characteristics of the resulting fibers were compared and the results achieved are as follows:
(1) coagulation medium—acetone, tensile strength—6.2 g/den, % elongation—15%;
(2) coagulation medium—ethyl alcohol, tensile strength—3.6 g/den, % elongation—not calculated.

EXAMPLE V

Cellulose (Avicel PH101) was dissolved in a solution of zinc chloride and the mixture was prepared according to the procedure described in Example I. The final $ZnCl_2$ concentration in the cellulose/$ZnCl_2$ mixture was 67% (w/w) and the cellulose concentration was 10% (w/v).

The mixture was heated and the resulting solution extruded into a bath containing ethyl alcohol as the coagulation medium. Three fibers were formed. One fiber was removed from the bath, air dried and stretched. The second fiber was transferred from the coagulation medium and placed directly into a water bath without drying or stretching, while the third fiber was removed from the coagulation medium, dried and stretched and recrystallized in a water bath as described in Example I.

The tensile strengths of the three fibers were 1.6, 1.9 and 5.2 g/den, respectively.

From consideration of the specification and examples, and practice of the invention as disclosed herein, other embodiments of the invention will be apparent to those skilled in the art. It is intended that the specification and examples be considered as exemplary only, with the scope and spirit of the invention being indicated by the following claims.

What is claimed is:

1. A method for producing high tensile strength, solvent-spun cellulose fiber or film which is stable in alkaline solutions, said process comprising the steps of:
    (a) forming an aqueous cellulose/zinc chloride ($Zncl_2$) mixture, said mixture having a final cellulose concentration in the range of from about 5% to about 45% weight to volume (w/v), and a final $Zncl_2$ concentration in the range of from about 55% to about 80% weight to weight (w/w);
    (b) stirring and heating said cellulose/$Zncl_2$ mixture at a temperature ranging from about 40° C. to about 120° C., thereby forming a cellulose/$Zncl_2$ solution;
    (c) extruding said cellulose/$ZnCl_2$ solution into a coagulation medium wherein the cellulose in said cellulose/$ZnCl_2$ solution coagulates to form a fiber or film, said fiber or said film not being fully crystallized;
    said coagulation medium comprising one or more alcohols or ketones;
    (d) removing said fiber or said film from said coagulation medium and treating said fiber or said film to remove residual solvent and coagulation medium therefrom;
    (e) applying tension to said fiber or said film sufficient to stretch said fiber or said film and orient the molecules therein;
    (f) submerging said fiber or said film in a bath containing water to fully crystallize said fiber or said film;
    (g) removing said fiber or said film from said bath for drying or further treatment.

2. The method of claim 1, wherein the cellulose has a DP in the range of from about 100 to 3000.

3. The method of claim 1, wherein said final $ZnCl_2$ concentration in said cellulose/$ZnCl_2$ mixture ranges from about 62% to about 76% (w/w).

4. The method of claim 3, wherein said final $ZnCl_2$ concentration is about 62% or about 76%.

5. The method of claim 1, wherein step (a) or (b) further comprises the sub-step of:
    (i) adding one or more compounds selected from the group consisting of chlorides of magnesium, calcium, lithium or aluminum to said $ZnCl_2$ solution, or to said cellulose/$ZnCl_2$ mixture.

6. The method of claim 1 wherein step (a) further comprises the sub-step of:

(i) pre-wetting the surface of said cellulose with water or water containing one or more compounds selected from the group consisting of chlorides of magnesium, calcium, lithium or aluminum to said cellulose prior to dissolution of said cellulose in said $ZnCl_2$ solution.

7. The method of claim 1, wherein said treatment of step (d) comprises evaporation.

8. The method of claim 1, wherein said cellulose/$ZnCl_2$ mixture is heated to a temperature in the range of from 40° C. to 100° C.

9. The method of claim 8, wherein said temperature is 65° C.

10. The method of claim 1, wherein said alcohols are selected from the group consisting of $C_1$ to $C_4$ alcohols.

11. The method of claim 10, wherein said alcohols are further selected from the group consisting of methyl, ethyl, propyl and isopropyl alcohol.

12. The method of claim 1, wherein said ketones are selected from the group consisting of $C_3$ to $C_5$ ketones.

13. The method of claim 12, wherein said ketones are further selected from the group consisting of acetone and methylethylketone (MEK).

14. A method for producing a food-quality solvent-spun cellulose fiber or film which is stable in alkaline solutions, said process comprising the steps of:

(a) forming an aqueous cellulose/zinc chloride ($ZnCl_2$) mixture, said cellulose and said zinc chloride being food-quality, and said mixture having a final cellulose concentration in the range of from about 5% to about 45% weight to volume (w/v), and a final $ZnCl_2$ concentration in the range of from about 55% to about 80% weight to weight (w/w);

(b) stirring and heating said cellulose/$ZnCl_2$ mixture at a temperature ranging from about 40° C. to about 120° C., thereby forming a cellulose/$ZnCl_2$ solution;

(c) extruding said cellulose/$ZnCl_2$ solution into a coagulation medium wherein the cellulose in said cellulose/$ZnCl_2$ solution coagulates to form fiber or film not being fully crystallized;

said coagulation medium comprising one or more alcohols or ketones;

(d) removing said fiber or said film from said coagulation medium and treating said fiber or said film to remove residual solvent and coagulation medium therefrom;

(e) applying tension to said fiber or said film sufficient to stretch said fiber or said film and orient the molecules therein;

(f) submerging said fiber or said film in a bath containing water to fully crystallize said fiber or said film;

(g) removing said fiber or said film from said bath for drying or further treatment.

15. The method of claim 14, wherein step (a) or (b) further comprises the sub-step of:

(i) adding one or more compounds selected from the group consisting of chlorides of magnesium, calcium, lithium or aluminum to said cellulose, said $ZnCl_2$ solution, or said cellulose/$ZnCl_2$ mixture.

16. The method of claim 14, wherein step (a) further comprises the sub-step of:

(i) pre-wetting the surface of said cellulose with water or water containing one or more compounds selected from the group consisting of chlorides of magnesium, calcium, lithium or aluminum to said cellulose prior to dissolution in said $ZnCl_2$ solution.

17. The method of claim 14, wherein said cellulose/$ZnCl_2$ mixture is heated to a temperature in the range of from 40° C. to 100° C.

18. The method of claim 17, wherein said temperature is 65° C.

19. The method of claim 14, wherein said alcohols are selected from the group consisting of $C_1$ to $C_4$ alcohols.

20. The method of claim 19, wherein said alcohols are further selected from the group consisting of methyl, ethyl, propyl and isopropyl alcohol.

21. The method of claim 14, wherein said ketones are selected from the group consisting of $C_3$ to $C_5$ ketones.

22. The method of claim 21, wherein said ketones are further selected from the group consisting of acetone and methylethylketone (MEK).

23. The method of claim 1, wherein said cellulose and said $ZnCl_2$ are food-quality.

* * * * *